United States Patent

[11] 3,545,794

| [72] | Inventors | Eugene H. Wise<br>Saugus;<br>Jon J. McDowell, North Hollywood, Calif. |
|---|---|---|
| [21] | Appl. No. | 822,274 |
| [22] | Filed | May 6, 1969 |
| [45] | Patented | Dec. 8, 1970 |
| [73] | Assignee | R. & G. Sloane Manufacturing Company, Inc.<br>a corporation of Delaware. by mesne assignment |

[54] COMPRESSION JOINT
8 Claims, 5 Drawing Figs.

[52] U.S. Cl............................................. 285/248,
285/340, 285/348, 285/349, 285/423
[51] Int. Cl..................................................... F16l 33/22
[50] Field of Search........................................... 285/340,
343, 382, 356, 349, 248, 348, 423

[56] References Cited
UNITED STATES PATENTS

| 2,219,053 | 10/1940 | Osborn........................ | 285/382X |
| 2,499,024 | 2/1950 | Hollyday...................... | 285/356X |
| 2,785,911 | 3/1957 | Kaufman...................... | 285/137X |
| 3,365,219 | 1/1968 | Nicolaus....................... | 285/340 |
| 3,404,905 | 10/1968 | Albrecht...................... | 285/340X |
| 3,429,596 | 2/1969 | Marshall....................... | 285/340 |

FOREIGN PATENTS

| 441,895 | 1/1968 | Switzerland.................. | 285/340 |

*Primary Examiner*—Dave W. Arola
*Attorney*—Martha L. Ross

ABSTRACT: A compression joint for flexible tubing, comprising a female coupling having an end counterbore in which the flexible tubing is received, and a packing nut surrounding the flexible tubing and being threadably secured to the female coupling. An annular sealing member is disposed between the female coupling and the flexible tubing, and a deformable locking ring is positioned adjacent the sealing member between the female coupling and the packing nut. An insert having an annular recess is positioned within the end of the flexible tubing adjacent the female coupling. When the packing nut is threaded onto the female coupling, the locking ring is pressed against the annular sealing member to provide a seal between the female coupling and the flexible tubing, and the flexible tubing is deformed by the locking ring into the recess in the insert to firmly retain the flexible tubing within the female coupling and the packing nut.

PATENTED DEC 8 1970  3,545,794

INVENTORS
EUGENE H. WISE
JON J. McDOWELL
BY Frank P. Presta
ATTORNEY

COMPRESSION JOINT

BACKGROUND AND SUMMARY OF THE INVENTION

This invention relates generally to a pipe joint and, more particularly, to a compression joint for flexible tubing.

Heretofore, many types of joints have been utilized for flexible tubing. Many of these joints, however, have been complicated in construction and thus expensive to manufacture and difficult to assemble; subject to leakage; and/or unable to be opened and reclosed without damaging the flexible tubing. A need has arisen, therefore, for a simple leak-proof joint for flexible tubing which can be opened and reclosed without damaging the tubing.

Accordingly, it is an object of the present invention to provide a new and improved joint for flexible tubing.

An additional object is to provide a compression joint for flexible tubing which is simple in construction, easily assembled and not subject to leakage.

A further object is to provide such a joint which can be opened and reclosed without damage to the flexible tubing.

A still further object is to provide such a joint wherein the flexible tubing is subjected to controlled deformation to positively retain the tubing within the joint without damaging the tubing.

Numerous other objects and advantages of the present invention will be apparent as it is better understood from the following description, which, taken in connection with the accompanying drawing, discloses preferred embodiments thereof.

The above objects are accomplished by providing a compression joint for flexible tubing, comprising a female coupling having an end counterbore in which an end of the flexible tubing is slidably received. A packing nut surrounds the end of the tubing disposed within the female coupling and is adapted to be threadably secured to the female coupling. An annular sealing member is disposed between the female coupling and the flexible tubing end and is adapted to be compressed by a deformable locking ring positioned between the end of the female coupling and the packing nut, and in surrounding relation to the flexible tubing. A substantially rigid tubular insert having an annular recess is positioned within the end of the flexible tubing disposed within the female coupling.

When the packing nut is threaded onto the female coupling, the locking ring is deformed into tight engagement with the annular sealing member to provide a seal between the female coupling and the tubing. The deformation of the locking ring also serves to deform the flexible tubing inwardly into the annular groove in the insert to firmly retain the tubing within the joint.

In a modification of the invention, a compression ring is positioned between the annular sealing member and the locking ring to provide for a controlled compression of the sealing member and to prevent undue friction or pinching of the sealing member that might be caused by the deformation of the locking ring. Also, an annular sleeve may be provided around the exterior of the packing nut to prevent undue expansion of the packing nut as it is threaded onto the female coupling and deforms the locking ring.

Referring to the drawings.

DESCRIPTION OF THE PREFERRED EMBODIMENTS

Figure 1:
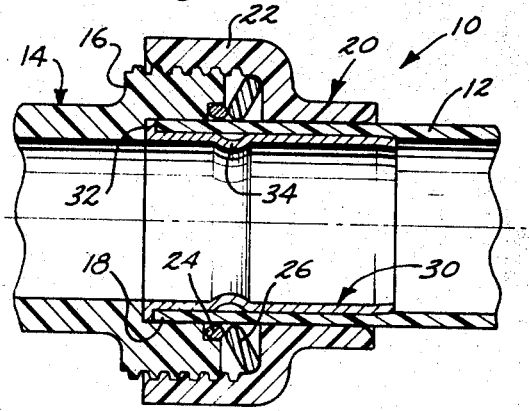
FIG. 1 is a side elevational view in section of a partially assembled joint for flexible tubing, constructed in accordance with the principles of the instant invention.
Figure 2:
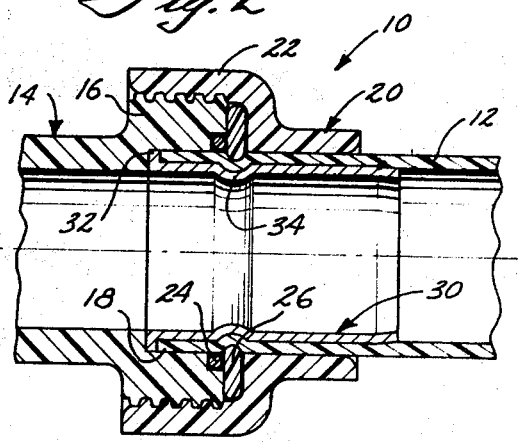
FIG. 2 is a view similar to FIG. 1, showing the parts of the joint in fully assembled relation.

As a preferred or exemplary embodiment of the instant invention, FIGS. 1 and 2 disclose a compression joint 10 for flexible tubing 12 formed of any suitable material, such as plastic or rubber. The joint 10 comprises a tubular female coupling 14 formed of any suitable material, such as polyvinyl chloride (PVC), polypropylene, polyethylene, acrylonitrile butadiene (ABS) or metal. The female coupling 14 is provided with an exteriorly threaded portion 16 and a counterbore 18 at its inner end within which the flexible tubing 12 is slidably received. An annular sealing member 24 is positioned within an annular recess in the end of the female coupling 14 to provide a seal between the female coupling and the flexible tubing 12. The sealing member 24 may be formed of any suitable rubber or plastic material.

A packing nut 20 is slidably and rotatably received on the flexible tubing 12 and is provided with an interiorly threaded portion 22 that is adapted to mate with the threaded portion 16 of the female coupling 14. The packing nut 20 may be formed of any suitable material, which may be the same as or similar to the female coupling material.

A locking ring 26 is disposed adjacent the sealing member 24 and between the female coupling 14 and the packing nut 20. The locking ring 26 may be formed of any suitable plastic or metallic material having rounded inner and outer annular surfaces. The radial thickness of the locking ring 26 is greater than the radial distance between the exterior of the flexible tubing 12 and the interior of the threaded portion 22 of the packing nut 20.

Figure 4:
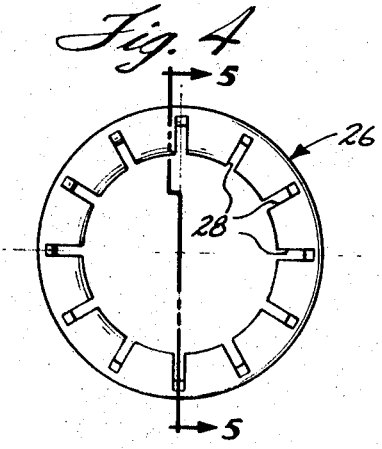
FIG. 4 is a front elevational view of a preferred form of locking ring suitable for use in the flexible tubing joint of the instant invention.
Figure 5:
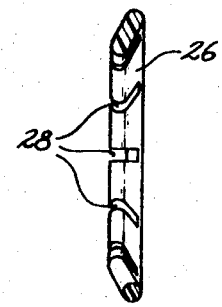
FIG. 5 is a sectional view taken substantially along line 5–5 in FIG. 4.

As shown in FIGS. 4 and 5, the locking ring 26 is frustoconical in shape and is provided with a plurality of slots 28 on its inner surface to allow the ring to be deformed. Although the slots are shown as being formed on the interior surface of the locking ring in FIGS. 4 and 5, it should be understood that the ring may be slotted in any other suitable manner to allow it to be deformed in accordance with the teachings of the instant invention.

Referring to FIGS. 1 and 2, a tubular support insert 30, formed of a suitable, substantially rigid plastic or metallic material is positioned within the end of the flexible tubing 12. The insert 30 has an outer diameter that is substantially the same as the inner diameter of the flexible tubing 12, and comprises an outwardly extending end portion 32 having a radial thickness that is substantially the same as that of the tubing 12, and an annular recess 34 positioned inwardly of the locking ring 26.

In the formation of the joint of the instant invention, the component parts of the joint are first relatively positioned in the manner shown in FIG. 1. This can be accomplished by first positioning the insert 30 within the end of the flexible tubing 12 and thereafter sliding the packing nut 20 and locking ring 26 over the end of the tubing 12. The tubing end is then positioned within the counterbore 18 in the end of the female coupling 14 which has already been provided with the annular sealing member 24 in the annular recess thereof. When the packing nut 20 is partially threaded onto the female coupling 14, the component parts of the subject joint are in the relative positions shown in FIG. 1.

Referring to FIG. 2, as the packing nut 22 is fully threaded onto the female coupling 14, the locking ring 26 is deformed into a nonconical configuration and into tight engagement with the annular sealing member 24 to compress the latter and provide a seal between the female coupling 14 and the flexible tubing 12. The deformation of the locking ring 26 also serves to deform the adjacent portion of the flexible tubing 12 inwardly into the recess 34 in the insert 30, thereby firmly retaining the flexible tubing 12 within the female coupling 14 and packing nut 20. Since the inner and outer annular surfaces of the locking ring 26 are rounded, the ring does not damage or cut into the tubing 12 or the nut 20, thereby enabling the joint to be opened and reclosed without damage to the component parts thereof.

Figure 3:
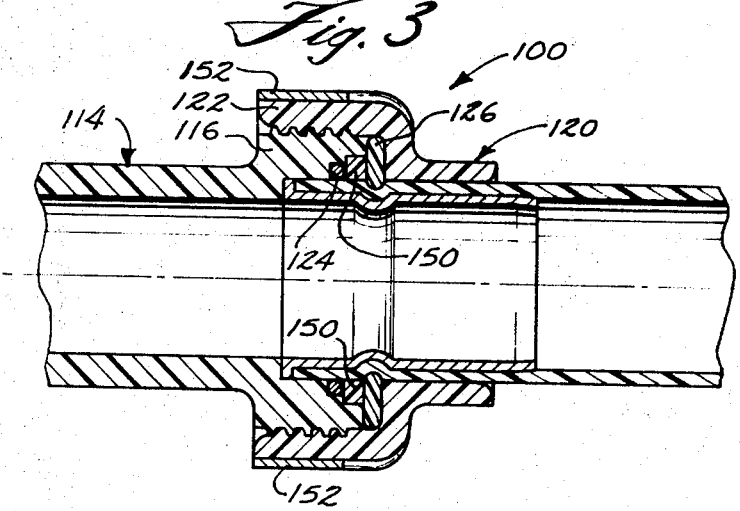
FIG. 3 is a view similar to FIG. 2, showing a modified form of joint for flexible tubing, with the parts in fully assembled relation.

A modification of the joint of the instant invention is shown in FIG. 3. In this embodiment, a compression ring 150 is positioned within an annular recess in the threaded portion 116 of the female coupling 114, and is disposed between the annular sealing member 124 and the locking ring 126. The compression ring 150 may be formed of any suitable, substantially rigid plastic or metallic material, and serves to transmit a predetermined pressure from the locking ring 126 to the annular sealing member 124 when the locking ring is deformed by the packing nut 120 as it is threaded onto the female coupling 114. The compression ring 150 also serves to prevent undue friction on the sealing member 124 and possible pinching thereof by the locking ring 126 when it is deformed.

As also shown in FIG. 3, a sleeve 152, formed of a suitable metallic or plastic material, surrounds the threaded portion 122 of the packing nut 120. The sleeve 152 serves to prevent expansion of the packing nut 120 as it is threaded onto the female coupling, which may result from the deformation of the locking ring 126.

It should be obvious that the particular embodiments and specific structures described above are merely examples of various types of joints embodying the general principles of this invention and should not be considered as limiting the scope of this invention to the embodiments specifically described.

We claim:

1. A joint for flexible tubing, comprising:
    a tubular female coupling having a counterbore in one end thereof in which the adjacent end of said flexible tubing is slidably positioned, said coupling having an annular recess in the end thereof adjacent said counterbore, said one end terminating in a planar face;
    an annular sealing member positioned in said recess in engagement with said outer surface of said tubing;
    a packing nut surrounding said tubing and being removably secured to said female coupling;
    a tubular support insert positioned within said end of said tubing and having an annular groove; and
    a deformable locking ring surrounding said tubing and being positioned between said female coupling and said nut, said locking ring having two sides and an inner and outer annular surface, said locking ring being normally of substantially frustoconical configuration, said nut being in engagement with said locking ring to deform it into a substantially flat configuration into tight engagement with said sealing member and into tight engagement with said planar face and into tight engagement with the portion of said tubing adjacent said tubular insert groove such that said tubing portion is deformed inwardly into said groove, said locking ring having a smooth rounded inner annular surface extending to both sides thereof and merging smoothly therewith so as not to cut into said tubing portion when it is in tight engagement therewith.

2. The joint of claim 1 wherein said locking ring comprises a plurality of slots therein to enable it to be deformed by said nut.

3. The joint of claim 2 wherein said slots are provided in the interior annular surface of said locking ring.

4. The joint of claim 1 wherein said coupling and said packing nut are removably secured by a threaded connection.

5. The joint of claim 4 wherein said coupling is provided with an exteriorly threaded portion, and said nut is provided with an interiorly threaded portion that is complementary with said coupling portion.

6. The joint of claim 1 wherein a restraining sleeve surrounds the exterior portion of said packing nut.

7. A joint for flexible tubing, comprising:
    a tubular female coupling having a counterbore in one end thereof in which the adjacent end of said flexible tubing is slidably positioned, said coupling having a first annular recess adjacent said counterbore and a second annular recess in the end thereof adjacent said first recess, said one end terminating in a planar face;
    an annular sealing member positioned in said first recess in engagement with the outer surface of said tubing;
    a compression ring positioned in said second recess in engagement with said sealing member;
    a packing nut surrounding said tubing and being removably secured to said female coupling;
    a tubular support insert positioned within said end of said tubing and having an annular groove; and
    a deformable locking ring surrounding said tubing and being positioned between said female coupling and said nut, said locking ring having two sides and an inner and outer annular surface, said locking ring being normally of substantially frustoconical configuration, said nut being in engagement with said locking ring to deform it into a substantially flat configuration into tight engagement with said compression ring to compress said sealing member and into tight engagement with said planar face and into tight engagement with the portion of said tubing adjacent said tubular groove such that said tubing portion is deformed inwardly into said groove, said locking ring having a smooth rounded inner annular surface extending to both sides thereof and merging smoothly therewith so as not to cut into said tubing portion when it is in tight engagement therewith.

8. The joint of claim 7 wherein said coupling and said packing nut are removably secured by a threaded connection.